United States Patent [19]

Roullet et al.

[11] 4,254,170

[45] Mar. 3, 1981

[54] PROCESS FOR RENDERING POLYESTER HOLLOW BODIES GASTIGHT

[75] Inventors: Gilbert Roullet, Tremblay les Gonesse; Pierre Legrand, Antony, both of France

[73] Assignee: Rhone-Poulenc Industries, Paris, France

[21] Appl. No.: 10,219

[22] Filed: Feb. 8, 1979

[30] Foreign Application Priority Data

Feb. 13, 1978 [FR] France ................................ 78 03939

[51] Int. Cl.³ ...................... B29C 17/07; B32B 27/08; B65D 23/02
[52] U.S. Cl. .................................... 428/36; 215/1 C; 264/516; 264/134; 428/35; 428/483; 428/521; 428/522; 428/523; 428/910

[58] Field of Search ............... 264/512, 513, 515, 516, 264/134; 215/1 C; 428/35, 483, 521–523, 36, 910; 427/171, 385 B

[56] References Cited

U.S. PATENT DOCUMENTS

| 3,505,264 | 4/1970 | Thoese et al. | 260/29.6 B |
| 4,079,850 | 3/1978 | Suzuki et al. | 264/173 X |
| 4,127,633 | 11/1978 | Addleman | 427/307 X |

Primary Examiner—Jan H. Silbaugh
Attorney, Agent, or Firm—McDougall, Hersh & Scott

[57] ABSTRACT

The invention pertains to a process for producing bioriented polyester hollow bodies characterized by good gas and flavor tightness, wherein one wall of a preform is coated with an aqueous composition consisting of at least two incompatible polymers, one of which is a water soluble polyvinyl alcohol and the other, a polymer latex with low water sensitivity; the coating is dried and the preform is bidrawn-blown.

12 Claims, 1 Drawing Figure

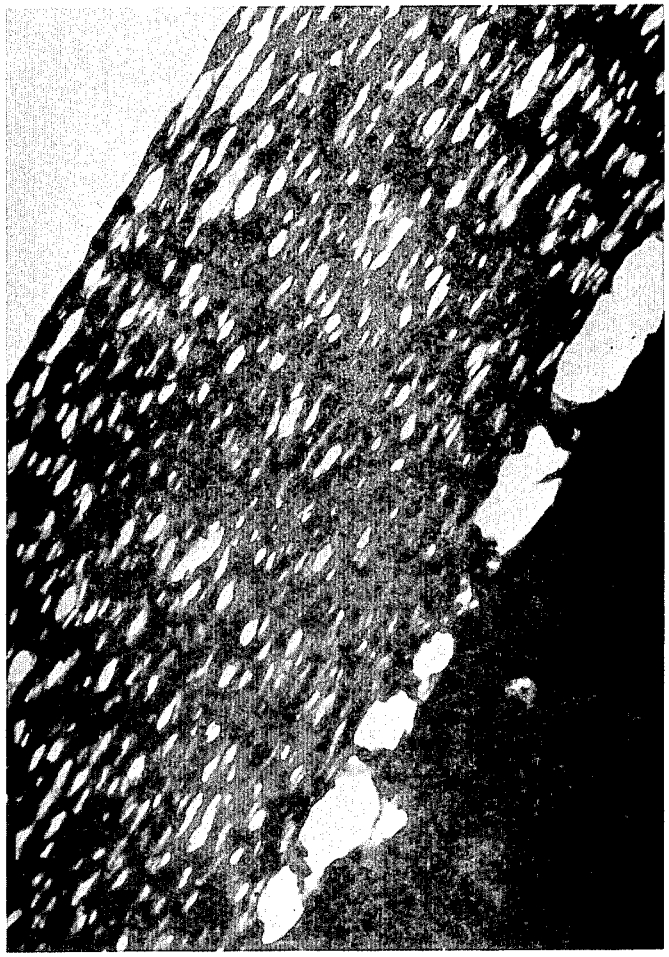

PROCESS FOR RENDERING POLYESTER HOLLOW BODIES GASTIGHT

This invention relates to a process for producing bioriented polyester composite hollow bodies by blowing from a preform and it relates more particularly to a process for producing bioriented polyester hollow bodies which are gas and flavor tight.

In the field of hollow bodies, polyesters have rapidly developed in recent years. In particular, ethylene polyrephtalate, by a biorientation-blowing process of preforms, has shown a remarkable aptitude for fabrication of bottles with excellent mechanical properties (notably shock resistance and resistance to internal pressure), allowing for their advantageous usage in the packaging of pressurized liquids and carbonated drinks. However, when dealing with highly flavored liquids and/or oxygen sensitive liquids and/or carbonated liquids, the packaged product is deficient from the standpoint of preservation, where the polyterephtalate hollow bodies are not sufficiently gas or flavor tight. This is even more so when the body wall is thin and when the ratio of the surface of the receptacle to the volume of the contents is significant. To reduce hollow body permeability, it has already been proposed to coat the surfaces using a "barrier" material with less permeability to gases than that of the substrate.

Polyvinyl alcohol, vinylidene polychloride and their copolymers are well known in this respect.

According to known processes, the coating can be applied either on the finished receptacle or on the preform; the various techniques include coextrusion, molding from a casting, and coating processes of soaking, pulverization, etc. The first two techniques require complex, costly equipment. The primary drawback of coating by soaking or pulverization on the finished product is that, due to the geometry of the receptacle, it is difficult to control the thickness of the deposited layer.

Coating by soaking or pulverization at the preform stage has been proposed for various substrates such as vinyl polychloride, polyolefins, polycarbonates and polyamides by using a latex of vinylidene polychloride (Belgian Pat. No. 803,139). However, the coating at the preform stage must be sufficiently thick since both coating thickness and wall thickness are reduced during the subsequent molding-blowing operation. In practice, the use of vinylidene polychloride involves the application of several successive layers with intermediate drying after each layer because, in the case of a thick layer, the surface film prevents the drying of the lower layers and can result in delamination.

Polyvinyl alcohol is a gas and flavor tight material superior to polyvinylidene chloride. However, polyvinyl alcohol coatings have various disadvantages in the presence of moisture. Among these are a perceptibly reduced tightness level, dangers of staining, changes in appearance, and in a general sense, reduced mechanical properties. It was found, therefore, highly desirable to protect the polyvinyl alcohol layer, after drying, with a second coating of waterproof and water insensitive polymer, for example in the form of a latex. Receptacles considerably less permeable to gas, even in a moist atmosphere, can be produced by this technique. However, it is limited because it requires an additional operation, thus increasing costs, and drying is difficult to control since, with an extended drying time, the water in the latex remoistens the underlying layer of polyvinyl alcohol and, on the other hand, quick drying may cause the surface to crack.

The present invention is intended to overcome these problems and provide a simple and efficient, yet economical, process for ensuring tightness and in which coating by applying several layers is not generally required, and which allows for the production of hollow bodies exhibiting sufficient gas and flavor tightness even in moist atmosphere, while preserving the desired qualities of brilliancy and transparency.

The process for producing hollow bodies according to the invention, consists of making of a preform, transfer of the preform in a mold, bidrawing-blowing in biorientation conditions, followed with cooling and removing the obtained hollow body from the mold. This process is characterized in that, at least one wall of the preform is coated with an aqueous composition consisting of at least two incompatible polymers, one of which a polyvinyl alcohol in water solution, and the other(s) a latex of polymer(s) with low water sensitivity and in the ratio of 0.4 to 3 polyvinyl alcohol/polymer by weight of dry material. The coating is dried before bidrawing-blowing. The hollow bodies produced by this process are also an object of the invention.

It has surprisingly been found that it was possible, in accordance with the practice of this invention, to produce hollow bodies which were sufficiently gastight in a moist atmosphere (60 to 80%) and had good optical properties, if, before bidrawing-blowing, the preform was first coated with the two incompatible polymers or two groups of incompatible polymers, and in determined proportions. After drying, the coating layer is drawn while undergoing blowing and cooled simultaneously with a polyester layer to which it is adhering. The final coating has a two-phase structure in which the polymer(s) of the latex constitute(s) a continuous phase and the polyvinyl alcohol a lamillar discontinuous phase, both phases being biorientated.

In the present description, preform refers to finished preforms as well as tubes, blanks, parisons.

The preform can be produced by any known means such as injection, injection-blowing, extrusion, extrusion-blowing compression or transfer molding. Coating can be performed either on the finished preform (closed end and open neck), or on the tube, as in the case of extrusion, in which case coating can be done in line with extrusion of the tube, or on blanks such as tube sections.

With respect to polyvinyl alcohol, products obtained from vinyl polyesters, containing at least 90% but preferably more than 97% polyvinyl alcohol moieties, are preferably selected. As vinyl polyesters, vinyl polyacetates and their copolymers rich in acetate, such as vinylethylene acetate, copolymers containing less than 10% ethylene units are particularly mentioned. These products are available on the market. Polyvinyl alcohol with less than 90% —$CH_2OH$ moieties can be used but they give lower gas tightness and are more sensitive to moisture. The molecular weight is selected, based on the coating thickness desired and the moisture level found during use. Products with low molecular weight are better in terms of technical and economical efficiency whereas products with high molecular weight provide the better protection against water. For example, when making bottles from a preform coated with a single layer, it is advisable to use a polyvinyl alcohol with a viscosity less than 20 pc (viscosity of a 4% by weight solution in water) and more specifically ranging from 2 to 10 pc and an ester index between 2 and 150, preferably lower than 20. Polyvinyl alcohol is generally used in the form of an aqueous solution at 5–25% in weight.

As waterproof and hardly water sensible latexes of polymers (homo or co-polymers), reference is made to styrene-butadiene or styrene-acrylate base latexes with a high styrene proportion, consisting preferably of more than 60% styrene units; unsaturated carboxylic acid alkyl or aryl ester base latexes, such as acrylates and methacrylates; unsaturated nitrile base latexes like acrylonitrile and methacrylonitrile; vinyl hologenide base latexes, such as vinyl chloride, vinyl bromide and vinylidene chloride; vinyl acetate base latexes. Mixtures of these various latexes can be used. The term "latex" is well known by all specialists and is used to refer to a dispersion of polymer in a continuous phase formed primarily of water. Although polymer particles can be of any appropriate size, they generally range from 0.05 to 5μ. The dry material percentage in latex is, in practice, between about 40 and 60% in weight. Polyvinylidene chloride and copolymer latexes rich in vinylidene chloride, containing more than 80% vinylidene chloride moieties are preferred because of their good drawing capability in conditions of biorientation of the polyester; in addition, they contribute to gastightness, adhere well, and have good appearance.

The polyvinyl alcohol/polymer dry material ratio of the latex selected is based on the nature of each constituent of the mixture, as a function of the desired water protection level, tightness level, appearance, adhesivity and coating weight. It must, nevertheless, be between 0.4 and 3. The preferred ratios are between 0.7 and 1.4, and particularly between 0.9 and 1.2.

The components can be easily mixed, under slow stirring, from a previously prepared aqueous solution of polyvinyl alcohol and the latex or latexes in the presence if need be of a small quantity of anti-foam or surface-active agents.

The application of the coating on the tube or preform can be done by any known method such as immersion, coating with a scraper or air doctor, pulverization, sprinkling, etc. . . . In order to facilitate wetting and adhesion, a preliminary surface treatment can be performed such as Corona discharge, flame treatment or application of a primer coat.

In addition to the major constituents, the coating applied on the preform can be formulated to contain emulsifiers, placticizers, antioxiding, anti-static agents, bactericides, fungicides, sliding agents, loads, colorants, pigments and cross-linking agents.

If the proportions and the nature of the mixture constituents are properly selected, the hollow bodies can acquire, with a single coating, sufficient gas and flavor tightness; however, it is of course possible and, in some cases, desirable to apply several successive coats of the same composition or compositions differing either in rate, in nature or in the constituent proportions.

The quantity of coating composition applied depends on the thickness reduction which occurs during bidrawing-blowing of the preform. The coating weight on the preform is generally between 10 and 100 g/m2 (measured in dry material).

The optimization of the coating properties depends not only on the nature and proportions of the mixture, but also on drying conditions, temperature and time. It has surprisingly been found that if the polyester preform is coated with an aqueous solution as defined above, an inversion of phases is obtained when drying is completed. After bidrawing in biorientation conditions, this gives the finished coating a two-phase structure in which polyvinyl alcohol appears in the form of a fine lamillar dispersion occluded in a waterproof polymer matrix. FIG. 1 shows a microphotograph of a cross-section of the coating. This particular structure results in a final hollow body exhibiting high gastightness, even in very moist atmosphere, as well as excellent optical and mechanical properties. The choice of the latex(es) and polyvinyl alcohol(s), be it with respect to their nature, dry material concentration, or respective properties, and the drying and drawing conditions, have a determining influence on the phase inversion process, the formation of the proper two-phase structure and consequently, on the coating properties, (transparency and brilliancy), adhesion to the substrate, resistance to streaking, gas and vapor tightness, and preservation of these characteristics during substantial variations in the ambient humidity.

At the beginning of drying and, as long as possible during this operation, there must be a two-phase system in which the continuous phase consists of water (possibly containing hydrosoluble adjuvants in low proportions) and polyvinyl alcohol, the dispersed phase being essentially composed of latex polymer particles. These must coalesce and the phase inversion should occur at the latest possible time, especially if the latex polymer is one that is highly waterproof.

For drying, hot air machines or infrared radiation machines with selected wave-length can be used. Depending on the compositions, the coating can be more easily drawn and biorientated thin sheets of polyvinyl alcohol more easily produced, if only partial drying is performed, for example up to a moisture content between 0.5 and 5%. Residual water is then eliminated after the hollow body is drawn. This post-drying can be carried out for example, by applying hot gas on the hollow body walls still covered with the coating, or yet by exposing the coating to infrared radiation of appropriate wave-length.

The resulting preform, directly coated or produced from a previously coated tube or blank, is then made into a bioriented hollow body in the usual manner and under the usual pressure and temperature conditions, that is, within the range of vitreous transition temperature and polyester crystallization temperature, in other words, between 85° and 130° C.

After the hollow body is formed and the coating possibly post-dried, the coating, according to an improvement in the present invention, can undergo a subsequent heat treatment for a few seconds at a temperature ranging from 80° to 200° C. This post-treatment can be performed in two steps, first at a temperature between 150° and 200° C., then at a temperature suitable for crystallization of the latex polymer.

Within the framework of the present invention, it is of course possible to increase the waterproofness of the obtained coating by applying another waterproof polymer coating on the preform or finished object. This additional coating can be applied by any known technique such as coating with melted latex or polymer, coextrusion-coating, encasing with a melted polymer. It is also possible to apply a stretchable or retractable polymer sleeve on the hollow body. This operation can be performed on the bottling assembly line, before or after filling.

The sleeve can be produced by crosswise cutting of a casing obtained either by extrusion-inflation (most common case for low density polyethylene, polypropylene, ethylene-vinyl acetate, ionomer resin and acrylonitrile copolymer casings) or from a flat film which is rolled and bonded or glued (case for PVC or polyvinylidene chloride). The sleeve may, of course, contain various adjuvants, notably colorants and UV absorbants, and it can be transparent or opaque, patterned or not. It is not necessary for the sleeve to cover the entire bottle surface. Depending on the type, except for the bottom and neck, only the straight, cylindrical part can be protected.

Hollow bodies produced according to the process of this invention are and remain gas and flavor tight in a very moist atmosphere. Their brilliancy is excellent, they are abrasion resistant and, in the absence of loads, are transparent. They are well suited for packaging pressurized liquids, highly flavored products, etc.

The following examples are given by way of illustration of and not by way of limitation:

EXAMPLE 1

A glycol ethylene polyterephtalate with an intrinsic viscosity of 0.8 dl/g is injection molded into a preform having a length of 160 mm, an outer diameter of 24.8 mm and a wall thickness of 3.2 mm.

A coating composition is prepared, consisting of x parts of an aqueous solution containing 19% by weight polyvinyl alcohol (Brand RHODOVIOL 4-20 of Rhone-Poulenc) and y parts of a 50% dry extract vinylidene chloride copolymer latex (Brand IXAN WA 91-C of Solvay).

The outside of the preform is surface treated by the Corona effect and then is dipped into a vat containing the above composition; the immersion depth is 145±2 mm and the immersion time is 5 seconds.

The bath temperature is maintained at 35° C.

The preform is then drained and dried by infrared radiation (average wave length 2μ) and hot air for 3 minutes, the temperature of the coating increasing from 35° to 125° C.

The coated preform is transformed into a 1.5 liter bottle biaxially oriented after heating to 105° C. by simultaneous drawing and blowing in a mold, the walls of which are maintained at 40° C.

The x/y ratio of the coating composition is varied and coating thickness and oxygen permeability are measured on the straight, cylindrical part of the bottle in dry gas and 45% relative humidity.

Oxygen permeability is measured by mass spectrometry under the following conditions: the coated side of the sample is in contact with dry or moist gas, the other side under vacuum is attached to the mass spectrometer which measures gas flow through the sample.

The results are expressed in $$\frac{cm^3 \cdot cm}{cm^2 \cdot S \cdot cmHg} \times 10^{12}$$

As comparison, a bottle is manufactured under the same conditions but from an uncoated preform.

TABLE 1

| x/y | 68/32 | 72.5/27.5 | 76/24 | Comparative Sample |
|---|---|---|---|---|
| Thickness of coating in microns | 3.9 | 3.9 | 3.5 | — |
| P (O$_2$) at 40° C. and 0% R.H. under 3 bars | 1.2 | 1.25 | 1 | 6.5 |

TABLE 1-continued

| x/y | 68/32 | 72.5/27.5 | 76/24 | Comparative Sample |
|---|---|---|---|---|
| P (O$_2$) at 40° C. and 45% R.H. under 3 bars | 1.3 | 1.2 | 1.2 | 5.8 |

If, the same coating thickness from a latex of the same vinylidene chloride polymer is desired, it would be necessary to apply 4 successive coats.

The bottles with the coating allow for a fruit drink to be stored 8 months without a change in taste in an atmosphere at 15°–30° C. and 50–75% relative humidity, as compared to 2½ months for the comparative sample bottle. Abrasion resistance is excellent.

EXAMPLE 2

Example 1 is repeated with these differences: the preform is coated in two successive layers and the ratios in dry material of polyvinyl alcohol (PVA) to latex polymer (VC2) are varied.

Polyvinyl alcohol: brand RHODOVIOL 4-20

Vinylidene chloride copolymer latex: brand IXAN WA 35

The results of permeability to oxygen are given in Table 2.

TABLE 2

| PVA / VC2 | | Thickness | P(O$_2$) at 40° C. and 0% R.H. under 3 bars | P(O$_2$) at 40° C. and 45% R.H. under 3 bars |
|---|---|---|---|---|
| 1st coat | 2nd coat | | | |
| 1.6 | 0.8 | 4.3 | 1.2 | 1 |
| 1.2 | 1.2 | 2.9 | 0.35 | 0.46 |
| 0.8 | 0.8 | 3 | 2.4 | 2 |
| 1.6 | 1.6 | 2.8 | 0.32 | 0.8 |

EXAMPLE 3

A polyester tube with an outer diameter of 24.8 mm, and thickness of 2 mm, made of glycol ethylene terephthalate, with an intrinsic viscosity measured in orthochlorophenol of 0.82 dl/g, is extruded at the outlet of a polycondensation reactor. By means of a gear pump with a discharge pressure of 300 bars, the melted polymer is sent through a 4 inch, 10 component static mixer (brand ROSS) equipped with a double casing having a heat exchange fluid flowing therethrough at 240° C., and then through a punch-drawplate assembly 30 to 40 mm in diameter. At the drawplate outlet, the extruded product enters a Kaufman type, water cooled mandrel and then is drained over a vat while being coated with an aqueous solution of 18% polyvinyl alcohol (brand RHODOVIOL 4-20 of Rhone-Poulenc) and 22 parts of vinyl polyacetate latex (RHODOPAS A 010). The bath temperature is maintained at 30° C. and the composition is constantly resupplied and sprayed on the tube by a pump equipped with two groups of 6 nozzles arranged in a crown around the tube and spaced at 20 cm from each other. After draining, the tube passes over a crescent-shaped metallic pre-scraper with an inner diameter of 26 mm, and then through 2 circular air doctors centered on the axis of the tube delivering warm air at 40° C. under 0.15 bar and 60° C. under 0.3 bar, respectively. The tube then goes through a one meter long radiant panel furnace which progressively raises the temperature from 60° to 105° C., and finally, it is sent into a drawing and cutting device where it is cut to 180 mm long sections.

The coating thickness is 26 microns.

The tube sections are used to make preforms which are bidrawn-blown at 105° C. into 1.5 liter bottles on the CORPOPLAST BAB 3 machine. Their permeability to dry oxygen at 40° C. is $1.4, 10^{-12} cm^3.cm/cm^2.s.cmHg$.

We claim:

1. In a process for producing bioriented polyester composite hollow bodies which includes the steps of making a preform, transferring the preform into a mold, bidrawing-blowing the preform under biorientation conditions to produce a hollow body, followed by cooling and removing the hollow body from the mold, the improvement comprising coating at least one wall of the preform with an aqueous composition composed of at least two imcompatible polymers, one of which is a polyvinyl alcohol in solution in water, and the other or others of which is a latex of relatively water insensitive polymers, in which the weight ratio of polyvinyl alcohol/latex polymer is between 0.4 and 3, to provide a two-phase system in which the polyvinyl alcohol solution forms a continuous phase and the water insensitive polymer is in the dispersed phase, drying the coating, followed by said bidrawing-blowing.

2. Process as claimed in claim 1, in which the viscosity of the polyvinyl alcohol is less than 20 cp (in solution at 4% in water) and the ester index is between 2 and 150.

3. Process as claimed in claim 1, in which the polymer latex is selected from the group consisting of styrene-butadiene, styrene-acrylate base latexes, unsaturated carboxylic acid aryl or alkyl ester base latexes, unsaturated nitrile base latexes, vinyl halogenide base latexes and vinyl acetate base latexes.

4. Process as claimed in claim 1, in which the polymer latex is a vinylidene chloride copolymer latex.

5. Process as claimed in claim 1, in which the coating composition includes a cross-linking agent.

6. Process as claimed in claim 1, in which the coating composition is composed of a 5-25% by weight polyvinyl alcohol aqueous solution and at least one relatively water insensitive polymer latex having a dry material content comprised between 40 and 60%, and in which the polyvinyl alcohol/latex polymer ratio is between 0.4 and 3.

7. Process as claimed in claim 1, in which the weight of dry coating on the preform is between 10 and 100 g/m2.

8. Process as claimed in claim 1, in which several coats are applied on the preform.

9. Process as claimed in claim 1, in which the coating or coatings is dried up to a residual moisture content between 0.5 and 5%, and post-drying the hollow body after it is blown.

10. Process as claimed in claim 9, which includes the step of heat treatment of the coating after bidrawing and blowing of the hollow body at a temperature between 80° and 200° C.

11. Process as claimed in claim 10, in which the heat treatment is carried out first at a temperature between 150° and 200° and then at a temperature which promotes the crystallization of the latex polymer.

12. Bioriented polyester composite hollow bodies, produced by the process of claim 1, having a coating with a two-phase structure formed of a bioriented continuous phase composed of a moisture insensitive polymer and a laminar, bioriented discontinuous phase composed of polyvinyl alcohol.

* * * * *